Dec. 8, 1964    D. A. WALTHER ETAL    3,160,441
WIDE BASE RIM AND WHEEL ASSEMBLIES
Filed July 19, 1961    2 Sheets-Sheet 1
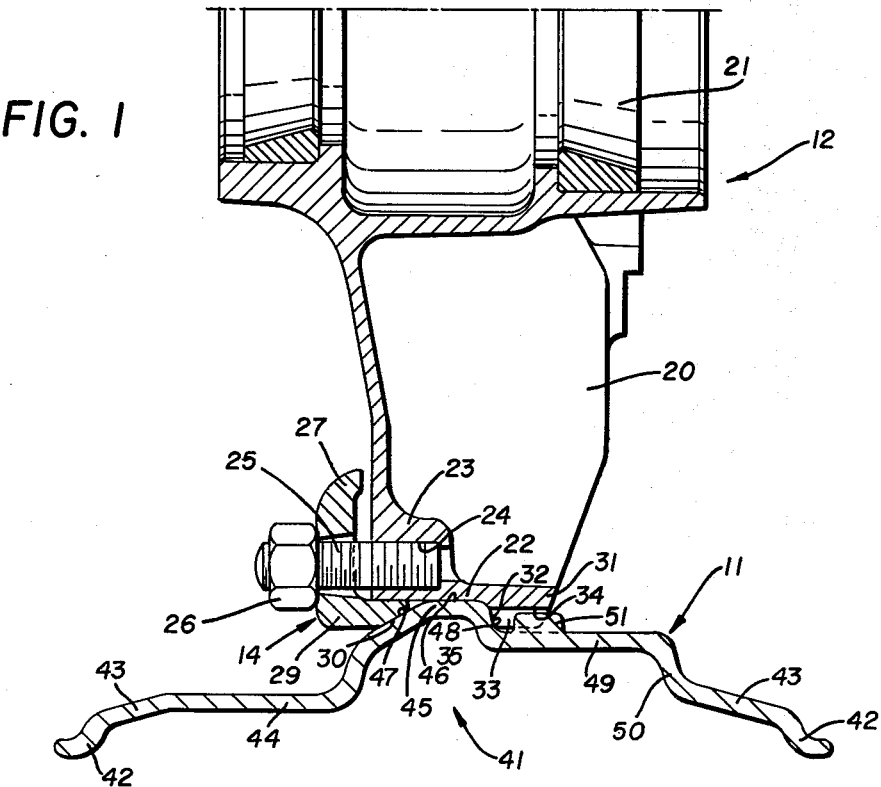
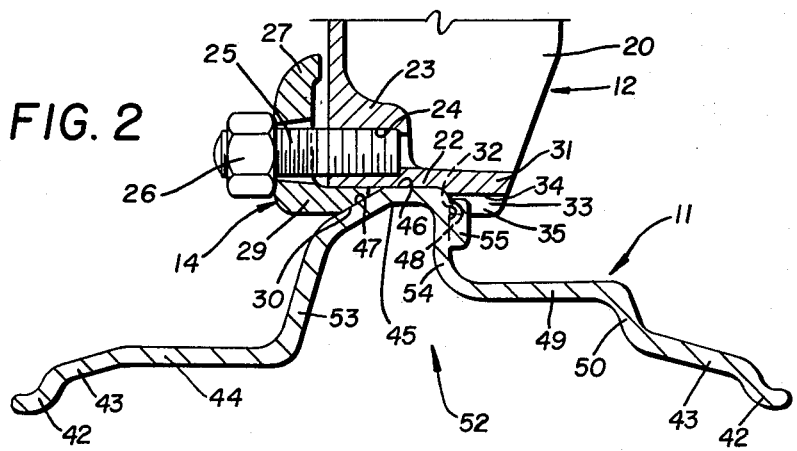
INVENTORS
DANIEL A. WALTHER &
WILLIAM D. WALTHER
BY
ATTORNEYS

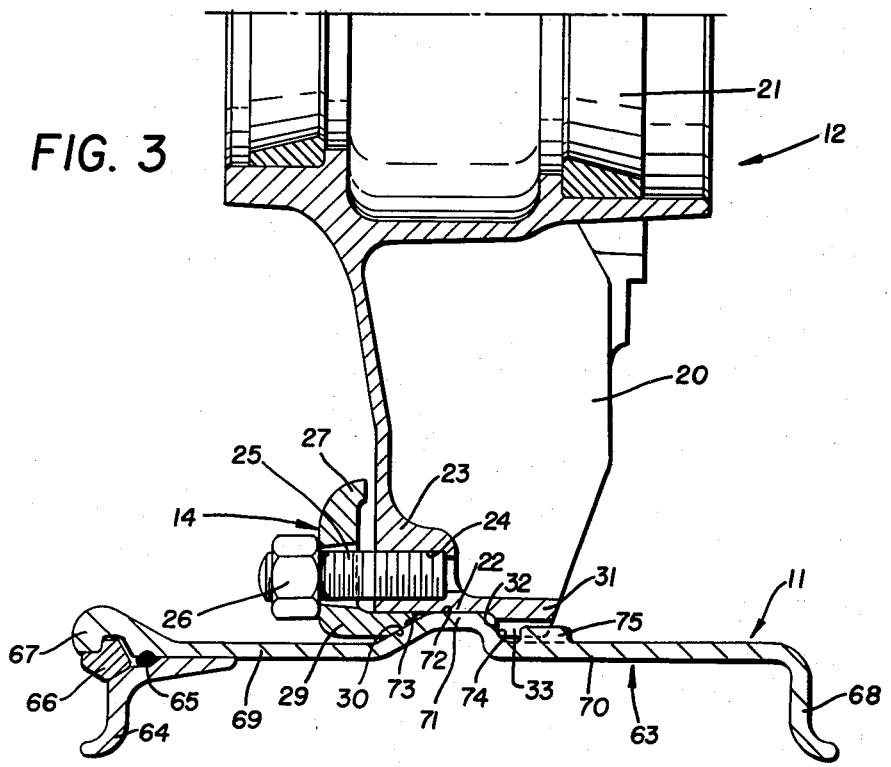
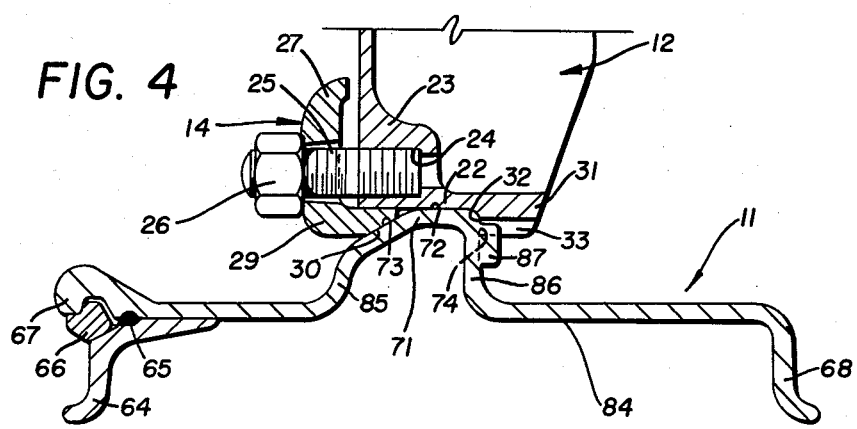

United States Patent Office 3,160,441
Patented Dec. 8, 1964

3,160,441
WIDE BASE RIM AND WHEEL ASSEMBLIES
Daniel A. Walther and William D. Walther, Dayton, Ohio, assignors to The Dayton Steel Foundry Company, Dayton, Ohio, a corporation of Ohio
Filed July 19, 1961, Ser. No. 125,241
3 Claims. (Cl. 301—12)

The present invention relates to rim and wheel assemblies for mounting automotive or vehicle tires. More particularly, the invention relates to novel concepts for rim and wheel assemblies particularly intended for the mounting of relatively "wide bead" or "wide base" truck tires.

The relatively wide bead or wide base truck tire, also currently being referred to by the trade names "Duplex" or "Super Single" tires, is a recent innovation. The advantages claimed for such a tire include greater over-the-road stability for the vehicle, wider spring spacing, higher load carrying capacity, elimination of fire hazards originating from driving on duals when one tire is flat, and reduction in inventory of spare tires. In any event, the relatively wide base truck tire renders conventional rim and wheel assemblies technically obsolescent and requires of new concepts for the mounting.

Therefore, it is an object of the present invention to provide improved rim and wheel assemblies for mounting relatively wide automotive or vehicle tires.

Further, it is an object to provide a rim construction, having bead flanges spaced sufficiently wide apart to accommodate a wide bead truck tire, and which can be mounted on a wheel in a secure and accurate manner by providing for maximum lateral and a maximum radial runout of not more than 0.015 inch, respectively.

Still further, it is an object to provide concepts of improved rims for mounting wide bead tires, which concepts can be applied to the construction of either a so-called "drop center rim" or the earlier form of so-called "flat base rim."

Still further, it is an object to provide a rim construction for mounting wide bead tires in which means are provided to interlock the rim and wheel components of an assembly so that the driving forces will be positively transmitted through the rim and wheel without slippage, distortion or undue axle wear.

These and other objects of the present invention, as well as the advantages thereof, will be apparent in view of the following detailed description of several forms of the invention and the attached drawings.

In the drawings, each of the views are fragmentary elevations in section showing various forms of rims and a wheel embodying the concepts of the invention. Specifically:

FIG. 1 shows an improved wheel mounting a smaller diameter improved rim of the "drop center type";

FIG. 2 shows the wheel of FIG. 1 mounting a larger diameter improved drop center type rim;

FIG. 3 shows the wheel of FIG. 1 mounting a smaller diameter improved rim of the "flat base type"; and FIG. 4 shows the wheel of FIG. 1 mounting a larger diameter improved flat base type rim.

A rim and wheel assembly according to the invention, for mounting wide bead truck tires is referred to hereafter and indicated generally by the numeral 10.

Each form of improved rim, indicated generally by the numeral 11, used in an assembly 10, has peripheral flanges for seating the tire beads, a relatively wide web or base portion connecting the bead flanges to provide the requisite spacing for the beads of a mounted tire, a relatively narrow radially inwardly directed rib member located medially of the web and having, a preferably flat and horizontal, axially extending load bearing surface with an inner diameter just slightly greater than the load bearing surface of the wheel, and preferably one or more radially inward facing axially extending driving lugs (or notches) on the web adjacent the medial rib.

The form of improved wheel indicated generally by the numeral 12 and shown in FIGS. 1–4, when used in an assembly 10, has a relatively narrow load bearing, felloe or "felly" surface on the outward ends of any desired number of radially extending spoke members, a radially outwardly directed flange portion at the axially inner end of the felly surface providing an axially inward stop or location surface for a rim 11, and, preferably, a series of driving notches (or lugs) extending axially inwardly through the flange portion from the stop surface to selectively interfit and positively interlock with at least one rim driving lug (or notch).

The rim 11 is secured on the wheel 12 by any suitable clamp means or device, such as a series of bolt supported clamp lugs, indicated generally by the numeral 14. The axially oriented leg of each clamp lug 14 frictionally seats between the wheel felly surface and the axially outward side of the rim medial rib.

A wheel 12 may have any desired number of spoke members 20 extending radially from a hub area 21 and terminating at their outward ends in an accurately machined load bearing or felly surface 22. The axially outer face of the terminal portion of each spoke member 20 is provided with a boss 23 having a threaded bore 24 for attachment of a clamp lug 14, as by a stud bolt 25 and nut 26.

Each clamp lug 14 has a radially oriented upright leg 27 with a slot for the supporting bolt 25. The horizontal leg or lateral portion 29 of a clamp 14 extends axially inward along the face of a wheel felly surface and terminates in an axially inward radially inclined conical surface or face 30 for wedging engagement with the axially outer side of the medial rib of a rim 11. The clamp face 30 is beveled at a standard clamping angle, e.g., approximately 28°, as shown.

The axially inner end of each relatively narrow felly surface 22 is terminated abruptly by a radially outwardly directed flange portion 31. The axially outer face of each flange 31 is accurately machined to provide a stop or location surface 32 for the medial rib of a rim 11. The surface 32 is preferably oriented substantially perpendicularly to the rotational axis of the wheel 12, for example, at a vertical angle of 80–90°, substantially as shown.

Each spoke flange 31 also preferably has at least one driving notch 33 extending through the flange and surface 32 on the axial center line of each felly surface 22. The floor 34 of each notch is preferably parallel to the felly surface and the side walls 35 are preferably perpendicular to the felly surface. However, the depth, axial position and exact shape of each notch 33 is not critical so long as the notches extend axially of the wheel flange 31 a distance sufficient to provide positive driving surfaces to engage a driving lug of a rim 11, as described below. Further, each wheel flange may have more than one notch 33, in which event element 33 could be considered as a driving "lug," with relieved areas on either side.

Referring to FIG. 1, the rim shown mounted on a wheel 12 will be referred to specifically as rim 41. A rim 41 is generally of the so-called drop center type, and could be used, for example, for mounting wide bead tires having a radial diameter of 20". A rim 41 has low side flanges 42 for confining the outer edge of each tire bead, integral peripheral bead flanges 43 having a standard 15–20° taper for the actual seating of each tire bead and safety ledge 44. Elements 42, 43 and 44 are found in conventional drop center rim constructions.

Axially inward of the safety ledge 44, the web or base portion of a rim 41 is integrally formed to provide a medial rib or load bearing member 45. The radially inward face of a medial rib 45 is flat and horizontal to provide an annularly continuous axially extending surface 46 for seating against the machined felly surfaces 22 of a wheel 12.

The axially outer side of a medial rib 45 is radially inclined at a suitable angle to provide an annularly continuous surface 47 for wedging engagement by the beveled surface 30 of each clamp lug 14.

The axially inner side of a medial rib 45 is radially or vertically oriented at a suitable angle to provide an annularly continuous surface 48 for mating engagement against the machined surface 32 of each spoke flange 31.

Axially inward of the rib surface 48, the web portion of a rim 41 has a horizontal portion 49 extending laterally to intersect a short vertical portion 50 extending radially inward from the axially inner bead flange 43. The approximately right angled portions 49 and 50 are preferably embodied in a rim 41 to provide for greater strength and rigidity of structure.

The radially inward face of the annularly continuous rim web portion 49 preferably carries at least one driving lug 51 suitably spaced and shaped to selectively engage and positively interlock with one of the driving notches 33 of the wheel 12. The spacing of a lug 51 laterally from the rib surface 48, and the length of a lug 51, is not critical so long as the lug extends axially of the rim a distance sufficient to provide positive driving surfaces to engage the wheel notches 33. Further, if the wheel notches are so formed as to be considered driving "lugs," an element 51 could be considered as a driving "notch" with a relieved area in the middle.

It will be noted that the concepts of the invention employ wheel and rim constructions that make it both possible and economically feasible to machine the wheel, after casting, and the rim, after fabrication, to a high degree of accuracy. Because of their relatively narrow width, the wheel felly surfaces 22 and rim mating surface 46 may be very accurately machined. In practice, it will be found that an accuracy of machining may be maintained such that the difference in diameters will not be in excess of .030". This will be just enough to allow a rim to be fitted over a wheel but will ensure the absolute minimum of radial runout in actual operation.

The same accuracy of machining may be achieved on the wheel flange surfaces 32 and mating rim surface 48, to an accuracy not in excess of .015", providing the absolute minimum of lateral or axial runout in actual operation.

Referring to FIG. 2, the rim shown mounted on a wheel 12 is specifically indicated as rim 52. The rim 52 is generally drop center type and could be used for mounting wide bead tires of larger diameter on a smaller diameter wheel, for example, for mounting wide bead tires having a radial diameter of 22" on a 20" wheel. A rim 52 is similar to a rim 41 in having side flanges 42, bead flanges 43, a safety ledge 44, horizontal web portion 49 and the short vertical portion 50. The axially outer and inner sides of the medial rib 45 include elongate portions 53 and 54 respectively, extending radially inwardly of the rim base portion, to maintain the surfaces 46, 47 and 48 in appropriate orientation to the mating surfaces of a wheel 12. Because of the increased diameter afforded by the elongate portions 53 and 54, it is preferred that the axially extending rim driving lug (or notch) 55 be vertically oriented along surfaces 48 and 54 so as to selectively engage and positively interlock with one of the driving notches 33 of a wheel 12.

Referring to FIG. 3, the rim shown mounted on a wheel 12 will be referred to specifically as rim 63. A rim 63 is generally of the so-called flat base type, and could be used, for example, for mounting wide bead tires having a radial diameter of 20". The axially outer side of a rim 63 has a removable bead flange 64, air seal 65, if the rim 63 is to mount a "tubeless tire," and lock ring 66 interfitting with a lock flange 67. The axially inner side of rim 63 has a fixed bead flange 68. Elements 64, 65, if used, 66, 67 and 68 are found in conventional flat base rim constructions.

Between the flanges 67 and 68, the web or base portion of a rim 63 has two laterally extending portions 69 and 70 connected by a medial rib or load bearing member 71. In the same manner as described above with respect to the medial rib 45 of a rim 41, the medial rib 71 of rim 63 has a flat and horizontal surface 72 seating against the felly surfaces 22 of a wheel 12, a radially inclined surface 73 for wedging engagement by the surface 30 of each clamp lug 14, and, a vertically oriented surface 74 for mating engagement against the surface 32 of each spoke flange 31. A rim 63 also preferably carries at least one driving lug 75, on the radially inward face of the rim web portion 70, similar to the driving lug 51 of a rim 41.

Referring to FIG. 4, the rim shown mounted on a wheel 12 will be referred to specifically as rim 84. The rim 84 is generally of the flat base type and could be used for mounting wide bead tires of larger diameter on a smaller diameter wheel, for example, for mounting wide bead tires having a radial diameter of 22" on a 20" wheel. A rim 84 is similar to a rim 63 in having a removable bead flange 64, air seal 65, lock ring 66, lock flange 67 and fixed bead flange 68. The axially outer and inner sides of the medial rib 71 include elongate portions 85 and 86, respectively, extending radially inwardly of the rim base porton to maintain the surfaces 72, 73 and 74 in appropriate orientation to the mating surfaces of a wheel 12. Because of the increased diameter afforded by the elongate rib portions 85 and 86, it is preferred that the axially extending rim driving lug 87 be vertically oriented along surfaces 74 and 86 so as to selectively engage and positively interlock with one of the driving notches 33 of wheel 12.

*Conclusion*

The above disclosure of several forms of rim and wheel assemblies particularly intended for the mounting of relatively wide bead or wide base truck tires is illustrative of the novel concepts of the invention. It will also be apparent from the disclosure that the various rim-wheel elements embodying the concepts of this invention could be changed or modified without departure from the true scope and spirit of the invention. Therefore, the true scope of the invention should be adjudged solely by the appended claims.

What is claimed is:

1. A rim and wheel assembly for wide bead tires, comprising, a wheel having a felly surface on the outward ends of radially extending spoke members and a radially outwardly directed flange portion at the axially inner end of each felly surface, clamp means including a beveled rim engaging surface extending axially inwardly along said felly surfaces, and a rim having peripheral flanges for seating the tire beads, a relatively wide base portion connecting the bead flanges, two elongate portions extending radially inwardly medially of said base portion, the axially inner of said elongate portions terminating in a surface oriented substantially perpendicularly to the rotational axis of the wheel for positioning the rim in relation to said felly flange portions, the axially outer of said elongate portions terminating in a surface oriented at an angle of approximately 28° for wedging engagement by the beveled surface extending inwardly of the clamp means, and a relatively narrow load bearing surface extending axially of said elongate portions for seating against said felly surfaces.

2. A rim and wheel assembly for wide bead tires, comprising, a wheel having a felly surface on the outward ends of radially extending spoke members, a radially outwardly directed flange portion at the axially inner end of each felly surface, and a series of notches extending axially inwardly through each flange portion, clamp means including a beveled rim engaging surface extending axially inwardly along said felly surfaces, and a rim having peripheral flanges for seating the tire beads, a relatively wide base portion connecting the bead flanges, two elongate portions extending radially inwardly medially of said base portion, the axially inner of said elongate portions terminating in a surface oriented substantially perpendicularly to the rotational axis of the wheel for positioning the rim in relation to said felly flange portions, the axially outer of said elongate portions terminating in a surface oriented at an angle of approximately 28° for wedging engagement by the beveled surface extending inwardly of the clamp means, a relatively narrow load bearing surface extending axially of said elongate portions for seating against said felly surfaces, and at least one axially extending lug on the axially inner of said elongate portions adjacent said load bearing surface selectively interfitting with one of said flange notches.

3. A rim and wheel assembly for wide bead tires, comprising, a wheel having a felly surface on the outward ends of radially extending spoke members and a radially outwardly directed flange portion at the axially inner end of each felly surface, the axially outer face of each flange portion having a surface oriented substantially perpendicularly to the rotational axis of the wheel, a plurality of bolt-supported clamp lugs having a lateral portion extending axially inwardly along said felly surfaces and terminating in a beveled rim engaging surface, and a rim having peripheral flanges for seating the tire beads, a relatively wide base portion connecting the bead flanges, and a relatively narrow radially inwardly directed rib member formed integrally with and located medially of said base portion, the radially inward face of said medial rib being flat and horizontal to provide an annularly continuous axially extending surface seating said rim against said felly surfaces, the axially inner side of said medial rib being oriented substantially perpendicularly to the rotational axis of the wheel to provide an annularly continuous surface positioning said rim in relation to said felly flange portions, the axially outer side of said medial rib being radially inclined to provide an annularly continuous surface in wedging engagement with the beveled surfaces of said clamp lugs.

References Cited in the file of this patent

UNITED STATES PATENTS

| | | |
|---|---|---|
| 1,299,541 | Baker | Apr. 8, 1919 |
| 1,816,943 | White | Aug. 4, 1931 |
| 1,869,635 | Walther | Aug. 2, 1932 |
| 1,884,936 | Walther | Oct. 25, 1932 |
| 1,894,251 | Woodward | Jan. 10, 1933 |
| 2,019,109 | Ash | Oct. 29, 1935 |
| 2,117,238 | Brink | May 10, 1938 |
| 2,135,481 | Brink | Nov. 8, 1938 |
| 2,167,102 | Burger | July 25, 1939 |
| 2,767,026 | Walther | Oct. 16, 1956 |
| 3,007,741 | Brown | Nov. 7, 1961 |

FOREIGN PATENTS

| | | |
|---|---|---|
| 982,468 | France | Jan. 31, 1951 |
| 1,259,338 | France | Mar. 13, 1961 |

UNITED STATES PATENT OFFICE
CERTIFICATE OF CORRECTION

Patent No. 3,160,441 December 8, 1964

Daniel A. Walther et al.

It is hereby certified that error appears in the above numbered patent requiring correction and that the said Letters Patent should read as corrected below.

Column 4, line 56 and column 5, line 1, after "surface,", each occurrence, insert -- the axially outer face of each flange portion having a surface oriented substantially perpendicularly to the rotational axis of the wheel, --.

Signed and sealed this 1st day of June 1965.

(SEAL)
Attest:

ERNEST W. SWIDER
Attesting Officer

EDWARD J. BRENNER
Commissioner of Patents